(12) United States Patent
Kamiyama

(10) Patent No.: US 8,715,190 B2
(45) Date of Patent: May 6, 2014

(54) ULTRASOUND DIAGNOSIS APPARATUS, IMAGE PROCESSING APPARATUS AND IMAGE PROCESSING METHOD

(75) Inventor: Naohisa Kamiyama, Otawara (JP)

(73) Assignees: Kabushiki Kaisha Toshiba, Tokyo (JP); Toshiba Medical Systems Corporation, Otawara-shi (JP)

(*) Notice: Subject to any disclaimer, the term of this patent is extended or adjusted under 35 U.S.C. 154(b) by 0 days.

(21) Appl. No.: 13/173,356

(22) Filed: Jun. 30, 2011

(65) Prior Publication Data

US 2012/0004552 A1 Jan. 5, 2012

(30) Foreign Application Priority Data

Jun. 30, 2010 (JP) ................................. 2010-150073
Jun. 13, 2011 (JP) ................................. 2011-131418

(51) Int. Cl.
*A61B 8/00* (2006.01)
*G06K 9/00* (2006.01)

(52) U.S. Cl.
USPC ............................ 600/443; 600/438; 382/128

(58) Field of Classification Search
USPC ................... 600/407, 437, 438, 443; 382/128
See application file for complete search history.

(56) References Cited

U.S. PATENT DOCUMENTS

| 6,120,455 | A | 9/2000 | Teo | |
| 6,306,092 | B1 * | 10/2001 | Yamrom et al. | 600/447 |
| 6,328,693 | B1 * | 12/2001 | Miyatake et al. | 600/437 |

FOREIGN PATENT DOCUMENTS

| JP | 2000-132664 | 5/2000 |
| WO | WO 00/24316 | 5/2000 |

OTHER PUBLICATIONS

Extended European Search Report issued Oct. 19, 2011, in Patent Application No. 11172211.2.

* cited by examiner

*Primary Examiner* — Long V. Le
*Assistant Examiner* — Katherine Fernandez
(74) *Attorney, Agent, or Firm* — Oblon, Spivak, McClelland, Maier & Neustadt, L.L.P.

(57) ABSTRACT

According to one embodiment, an ultrasound diagnosis apparatus includes a change amount calculating unit, an estimating unit and a control unit. The change amount calculating unit is configured to calculate amount of change of a pattern of each of a plurality of local regions among a plurality of ultrasound images generated along time series based on a reflected wave of an ultrasound wave transmitted by an ultrasound probe. The estimating unit is configured to estimate a position of a rotation axis of a scanning cross-section in each ultrasound image based on the amount of change of the pattern of each of the plurality of local regions calculated by the change amount calculating unit. The control unit is configured to superimpose the rotation axis estimated by the estimating unit on each ultrasound image and displays the same on a monitor.

21 Claims, 8 Drawing Sheets

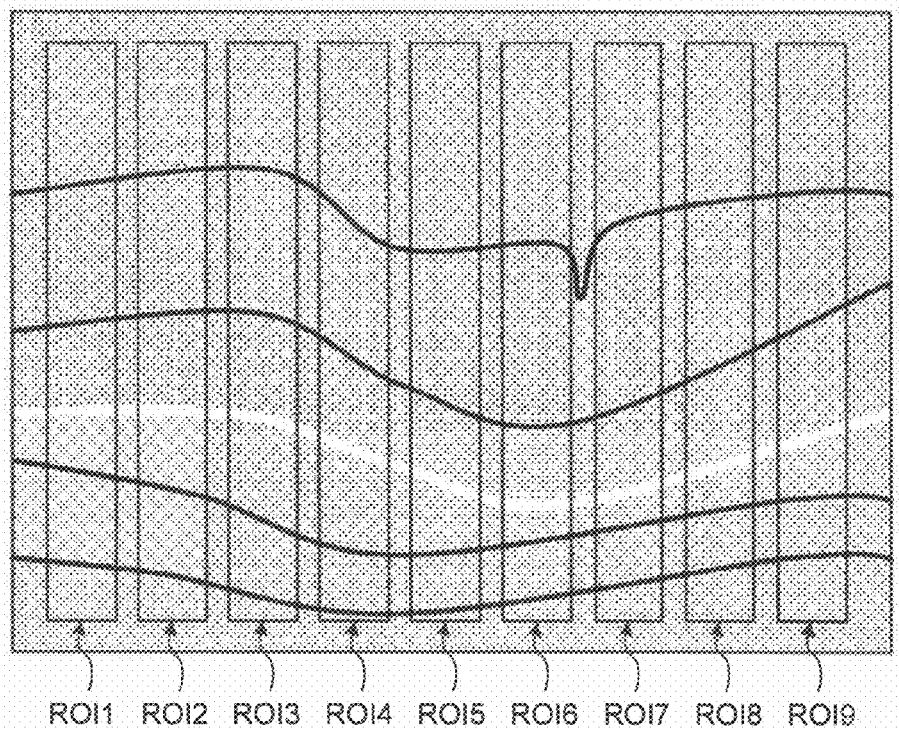

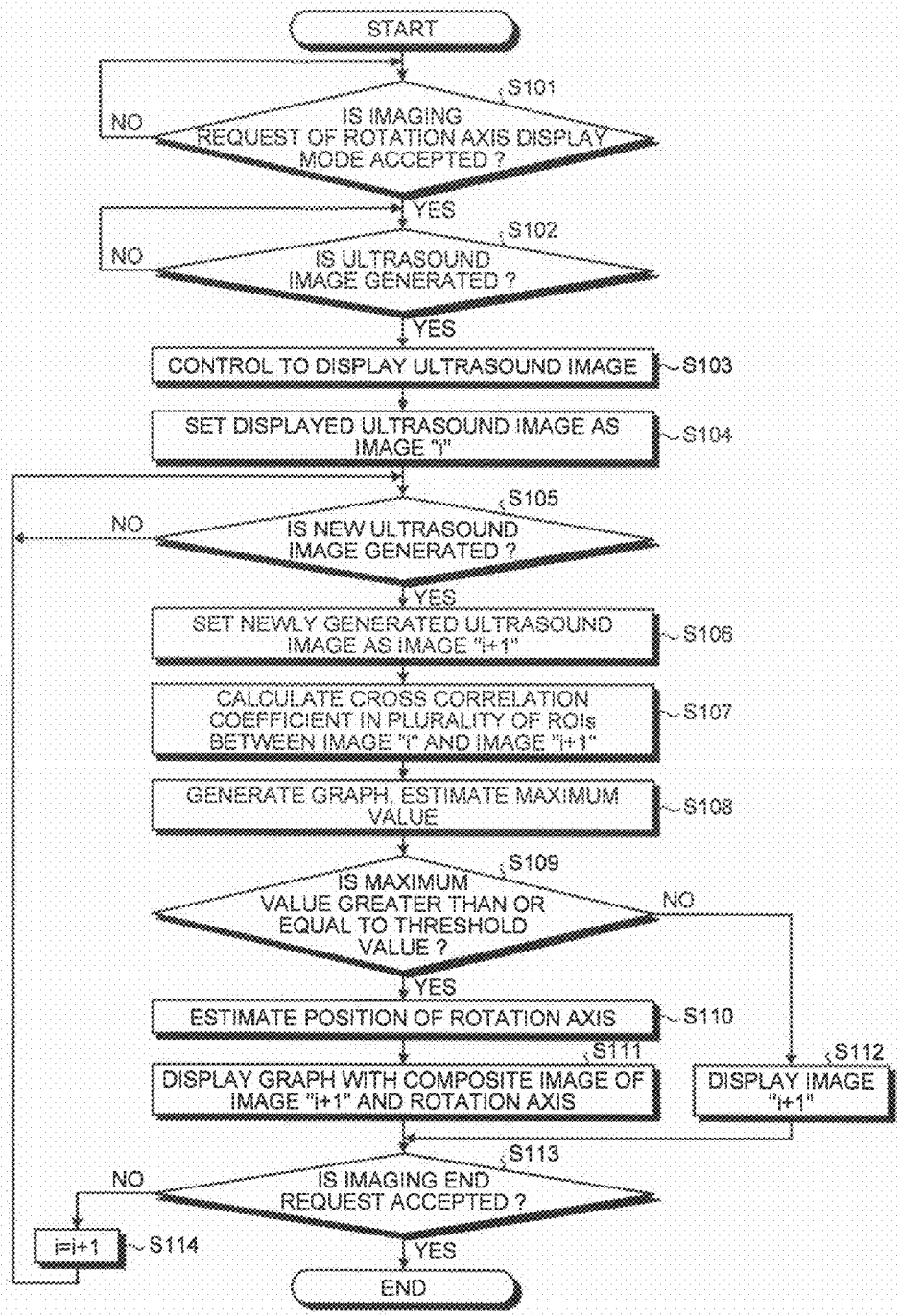

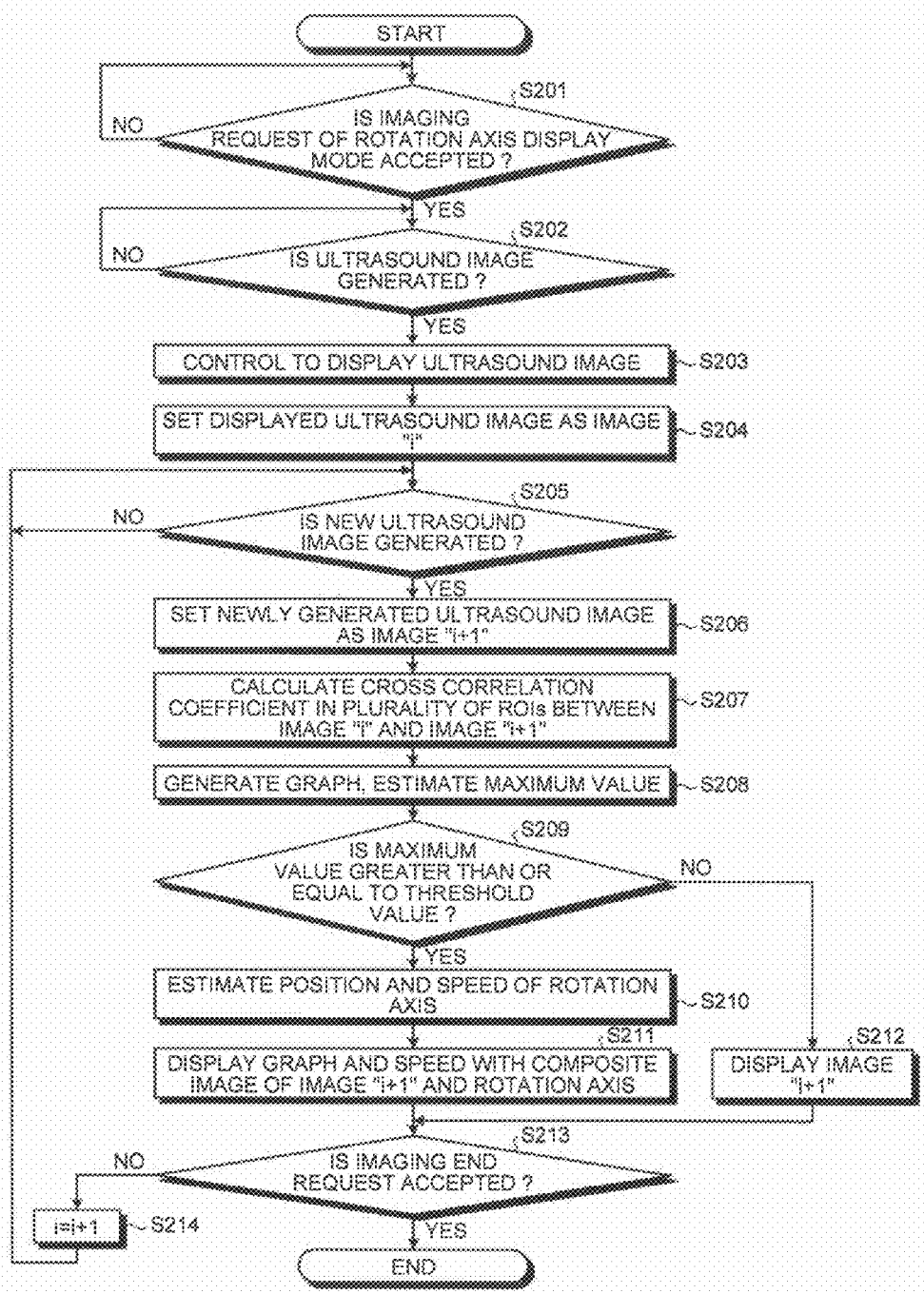

ULTRASOUND DIAGNOSIS APPARATUS, IMAGE PROCESSING APPARATUS AND IMAGE PROCESSING METHOD

CROSS-REFERENCE TO RELATED APPLICATIONS

This application is based upon and claims the benefit of priority from Japanese Patent Application No. 2010-150073, filed on Jun. 30, 2010, and Japanese Patent Application No. 2011-131418, filed on Jun. 13, 2011; the entire contents of all of which are incorporated herein by reference.

FIELD

Embodiments described herein relate generally to an ultrasound diagnosis apparatus, an image processing apparatus, and an image processing method.

BACKGROUND

In the related art, the ultrasound diagnosis apparatus plays an important role in the current medical services as a medical image diagnosis device having various advantages such as being easy and convenient to operate, being non-invasive with no possibility of exposure, and being of small device scale.

In other words, the ultrasound diagnosis apparatus can display the state of movement to be tested such as the pulsation of the heart or the movement of a fetus in real time with a simple and convenient operation of merely placing an ultrasound probe on the body surface. The ultrasound diagnosis apparatus is also very safe as it is non-invasive, and can carry out the test repeatedly. The ultrasound diagnosis apparatus has a small device scale compared to other medical image diagnosis apparatuses such as an X-ray diagnosis apparatus, an X-ray CT (Computed Tomography) apparatus, and an MRI (Magnetic Resonance Imaging) apparatus, and can easily carry out the test by being moved to the bed side. An apparatus miniaturized to an extent it can be carried around with one hand is also being developed in the ultrasound diagnosis apparatus that has no possibility of exposure, where such ultrasound diagnosis apparatus can be easily used even in medical sites such as obstetrics or home medical care.

The diagnosis method using the real time property of the ultrasound diagnosis apparatus includes the following procedures. If a tumor lesion is found in the ultrasound image, which is a tomographic image, the operator may rotate the ultrasound probe (e.g., rotate 90 degrees) to observe the mass lesion with a different cross-section, or measure the size of the mass lesion. The operator can determine whether the shape of the mass is circular or elliptical according to such observation. The cross-section of most blood vessels is circular. Therefore, even with respect to the site that appears circular on one ultrasound image, the operator can check that the relevant site is tubular by referencing the ultrasound image generated with the ultrasound probe rotated 90 degrees.

The observation involving the procedure of the operator is carried out in real time, and hence the ultrasound image for diagnosis is often recorded as a moving image including even during the rotation of the ultrasound probe. The two-dimensional tomographic image, however, involves the following inconveniences.

In other words, as the scanning surface of the ultrasound wave changes along time series when rotating the ultrasound probe, it is difficult to distinguish how the ultrasound probe is being moved even by referencing the ultrasound image. For instance, it is difficult for the reader to distinguish the difference even by referencing the ultrasound image for when the ultrasound probe is rotationally moved and for when the ultrasound probe is moved in the perpendicular direction without being rotated since the scanning surface changes in both cases. In particular, when browsing the recorded moving image after-the-fact, or when a person other than the operator reads the image with reference to the moving image, it is difficult to determine the movement state of the ultrasound probe simply from the ultrasound image. If the ultrasound probe is parallel moved along the fault surface, the reader can easily determine the movement state of the ultrasound probe as it moves to the right or the left while maintaining the pattern in the ultrasound image on the moving image.

BRIEF DESCRIPTION OF THE DRAWINGS

FIG. 3 is a schematic diagram for explaining one embodiment of a local region;

FIG. 6 is a flowchart for explaining the process of the ultrasound diagnosis apparatus according to the first embodiment;

FIG. 8 is a flowchart for describing the process of the ultrasound diagnosis apparatus according to the second embodiment.

DETAILED DESCRIPTION

According to one embodiment, an ultrasound diagnosis apparatus includes a change amount calculating unit, an estimating unit and a control unit. The change amount calculating unit is configured to calculate amount of change of a pattern of each of a plurality of local regions among a plurality of ultrasound images generated along time series based on a reflected wave of an ultrasound wave transmitted by an ultrasound probe. The estimating unit is configured to estimate a position of a rotation axis of a scanning cross-section in each ultrasound image based on the amount of change of the pattern of each of the plurality of local regions calculated by the change amount calculating unit. The control unit is configured to superimpose the rotation axis estimated by the estimating unit on each ultrasound image and displays the same on a monitor.

Hereinafter, embodiments of an ultrasound diagnosis apparatus will be described in detail with reference to the accompanying drawings.

Figure 1:
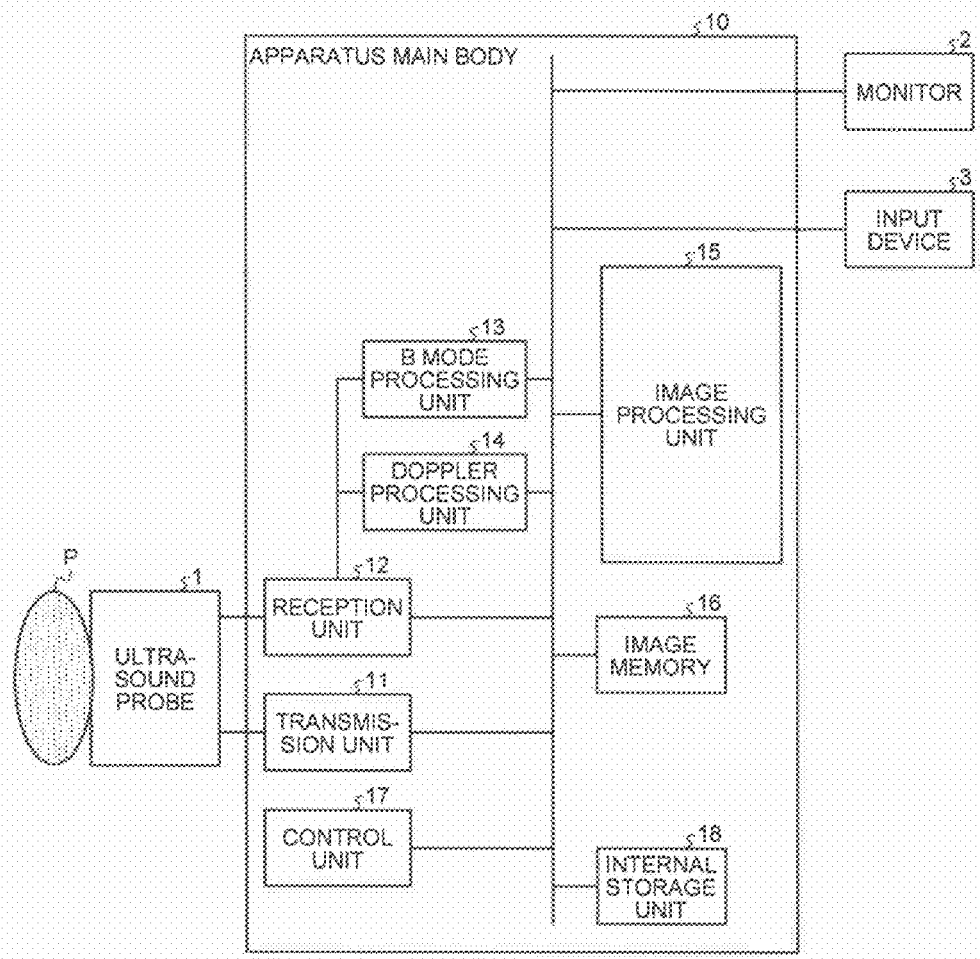
FIG. 1 is a schematic diagram for explaining a configuration of an ultrasound diagnosis apparatus according to a first embodiment.

First, the configuration of an ultrasound diagnosis apparatus according to a first embodiment will be described. FIG. 1 is a schematic diagram for explaining a configuration of an ultrasound diagnosis apparatus according to the first embodiment. As shown in FIG. 1, the ultrasound diagnosis apparatus according to the first embodiment is configured by an ultrasound probe 1, a monitor 2, an input device 3, and an apparatus main body 10.

The ultrasound probe 1 includes a plurality of piezoelectric vibrators arrayed in a line, which plurality of piezoelectric vibrators generate an ultrasound wave based on a drive signal provided from a transmission unit 11 of the apparatus main body 10, to be described later, and also receive a reflected wave from a subject P and convert it to an electric signal. The ultrasound probe 1 includes a matching layer arranged in the piezoelectric vibrator, a backing material for preventing propagation of the ultrasound wave from the piezoelectric vibrator to the back side.

When the ultrasound wave is transmitted from the ultrasound probe 1 to the subject P, the transmitted ultrasound wave is sequentially reflected by the discontinuing surface of the acoustic impedance in internal body tissue of the subject P, and received as a reflected wave signal by the piezoelectric vibrators included in the ultrasound probe 1. The amplitude of the received reflected wave signal depends on the difference of the acoustic impedance at the discontinuing surface where the ultrasound wave is reflected. A reflected wave signal when a transmitted ultrasound pulse is reflected by a moving blood flow or a surface of a heart wall is affected by a frequency deviation, dependently on a velocity component in the ultrasound transmitting direction of a moving object, due to the Doppler effect.

The monitor 2 displays a GUI (Graphical User Interface) for the operator of the ultrasound diagnosis apparatus to input various types of setting requests using the input device 3, and displays an ultrasound image generated by the apparatus main body 10.

The input device 3 includes a mouse, a keyboard, a button, a panel switch, a touch command screen, a foot switch, a trackball or the like, and accepts the various types of setting request from the operator of the ultrasound diagnosis apparatus and transfers such accepted various types of setting requests to the apparatus main body 10. For instance, the input device 3 according to the first embodiment includes a "start switch of rotation axis display mode" for accepting the start of image processing by an image processing unit 15, to be described later, from the operator.

The apparatus main body 10 is a device for generating an ultrasound image based on the reflected wave received by the ultrasound probe 1, and includes a transmission unit 11, a reception unit 12, a B mode processing unit 13, a Doppler processing unit 14, an image processing unit 15, an image memory 16, a control unit 17, and an internal storage unit 18, as shown in FIG. 1.

The transmission unit 11 includes a trigger generation circuit, a delay circuit, a pulser circuit, or the like, and provides a drive signal to the ultrasound probe 1. The pulser circuit repeatedly generates a rate pulse for forming the transmission ultrasound wave at a predetermined rate frequency. The delay circuit provides a delay time for every piezoelectric vibrator used to converge the ultrasound wave generated from the ultrasound probe 1 to a beam shape and determine the transmission directivity to each rate pulse generated by the pulser circuit. The trigger generation circuit applies the drive signal (drive pulse) to the ultrasound probe 1 at a timing based on the rate pulse.

The reception unit 12 includes an amplifier circuit, an A/D (analog/digital) converter, an adder, and the like, and generates reflected wave data by performing various processes on the reflected wave signal received by the ultrasound probe 1. The amplifier circuit amplifies the reflected wave signal and performs the gain correction process. The A/D converter converts from analog to digital the reflected wave signal of which gain is corrected, and gives a delay time required for determining reception directivity. The adder performs an adding process of the reflected wave signal processed by the A/D converter to generate reflected wave data. The reflection component from the direction corresponding to the reception directivity of the reflected wave signal is emphasized by the adding process of the adder.

Therefore, the transmission unit 11 and the reception unit 12 control the transmission directivity and the reception directivity in the transmission and reception of the ultrasound wave.

The B mode processing unit 13 receives the reflected wave data from the reception unit 12 and performs logarithmic amplification, envelope curve detection process and the like to generate data (B mode data) that a signal strength is expressed by the brightness.

The Doppler processing unit 14 performs frequency analysis on velocity information from the reflected wave data received from the receiving unit 12; extracts components of a blood flow, tissue, and echo signal from contrast agent by Doppler effects; and creates data (Doppler data) that moving object information, such as an average velocity, a distribution, a power, and the like, are extracted with respect to multiple points.

The image processing unit 15 generates an ultrasound image for display from the B mode data generated by the B mode processing unit 13 and the Doppler data generated by the Doppler processing unit 14. Specifically, the image processing unit 15 converts (scan converts) a scanning-line signal sequence of an ultrasound scan into a scanning-line signal sequence in a video format typified by television or the like to generate an ultrasound image (B mode image and Doppler image) serving as a display image from the B mode data and the Doppler data. In other words, the B mode data and the Doppler data are the ultrasound images before the scan convert process, and are ultrasound images for generating the ultrasound image for display. In the following description, the B mode data and the Doppler data are sometimes described as raw data.

The image processing unit 15 outputs a composite image in which character information of various parameters, scale, body marks, and the like are synthesized to the generated ultrasound image to the monitor 2. The image processing unit 15 also performs image processing, to be described in detail later, with respect to the ultrasound image for display and the raw data.

The image memory 16 is a memory for storing the ultrasound mage generated by the image processing unit 15, and the image generated by image processing the ultrasound image by means of the image processing unit 15. The image memory 16 can also store the raw data generated by the B mode processing unit 13 and the Doppler processing unit 14.

The control unit 17 controls processing by the ultrasound diagnosis apparatus overall. Specifically, the control unit 17 controls processing performed by the transmitting unit 11, the receiving unit 12, the B-mode processing unit 13, the Doppler processing unit 14, and the image processing unit 15, based on various setting requests input by the operator via the input device 3 and various control programs and various setting information read from the internal storage unit 18. Moreover, the control unit 17 performs control so as to display on the monitor 2 an ultrasound image stored by the image memory 16, and the like.

The internal storage unit 18 stores control programs for performing transmission and reception of ultrasound waves, image processing, and display process, diagnosis information (e.g., patient ID, doctor's remarks, etc.), diagnosis protocols, and various types of data such as various types of setting information. The internal storage unit 18 is also used to archive the images stored by the image memory 16, as necessary. The data stored in the internal storage unit 18 can be transferred to an external peripheral device via an interface circuit (not shown).

The overall configuration of the ultrasound diagnosis apparatus according to the first embodiment has been described above. According to such configuration, the ultrasound diagnosis apparatus according to the first embodiment generates the ultrasound image based on the reflected wave of the ultrasound wave transmitted by the ultrasound probe 1. The operator of the ultrasound diagnosis apparatus according to the first embodiment carries out the procedure of referencing the ultrasound image which is a tomographic image, and rotating the ultrasound probe 1 at the body surface of the subject P to observe the shape of the site focused in the ultrasound image. In such a case, the ultrasound diagnosis apparatus according to the first embodiment displays as moving images a plurality of ultrasound images sequentially generated along time series during the rotation on the monitor 2. The image memory 16 stores the moving images of a plurality of ultrasound images sequentially generated along time series. However, it may be inconvenient for the operator to observe the moving image of the two-dimensional ultrasound image generated by rotating the ultrasound probe 1.

In other words, when rotating the ultrasound probe 1, it is difficult to determine how the ultrasound probe 1 is being moved even by referencing the ultrasound image since the scanning cross-section of the ultrasound wave changes along time series. For instance, it is difficult for the reader to distinguish the difference even by referencing the ultrasound image for when the ultrasound probe 1 is rotationally moved and for when the ultrasound probe 1 is moved in the perpendicular direction without being rotated since the scanning surface changes in both cases. In particular, when browsing the moving image recorded in the image memory 16 after-the-fact, or when a person other than the operator reads the image with reference to the moving image, it is difficult to determine the movement state of the ultrasound probe 1 simply from the ultrasound image. If the ultrasound probe 1 is parallel moved along the fault surface, the reader can easily determine the movement state of the ultrasound probe 1 as it moves to the right or the left while maintaining the pattern in the ultrasound image on the moving image.

Therefore, the ultrasound diagnosis apparatus according to the first embodiment can easily determine the movement state of the ultrasound probe 1 through the processes of the image processing unit 15, to be hereinafter described in detail.

Figure 2:
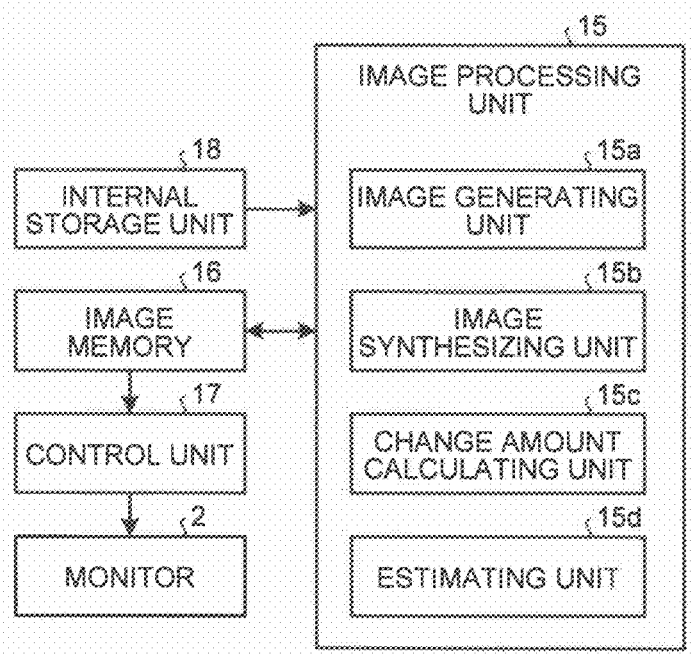
FIG. 2 is a schematic diagram for explaining a configuration of an image processing unit according to a first embodiment.

The image processing executed by the image processing unit 15 according to the first embodiment will be described in detail using FIG. 2 and the like. FIG. 2 is a schematic diagram for explaining a configuration of the image processing unit according to the first embodiment. As shown in FIG. 2, the image processing unit 15 according to the first embodiment includes an image generating unit 15*a*, an image synthesizing unit 15*b*, a change amount calculating unit 15*c*, and an estimating unit 15*d*.

The image generating unit 15*a* generates the B mode image from the B mode data and generates the Doppler image from the Doppler data as the ultrasound image for display, and stores the generated ultrasound images in the image memory 16. For instance, the image generating unit 15*a* generates a plurality of B mode images along time series from a plurality of B mode data (raw data) sequentially generated along time series by the B mode processing unit 13 while a doctor or a technician, or an operator, is rotating the ultrasound probe 1 placed on the subject P.

The image synthesizing unit 15*b* generates a composite image in which character information of various parameters, scale, body mark, and the like are synthesized to the ultrasound image generated by the image generating unit 15*a*, and outputs the generated composite image to the monitor 2 under the control of the control unit 17.

The change amount calculating unit 15*c* calculates the amount of change of the pattern of each of a plurality of local regions among the plurality of ultrasound images generated along time series based on the reflected wave of the ultrasound wave transmitted by the ultrasound probe 1. Specifically, the change amount calculating unit 15*c* calculates the amount of change of the pattern of each of the plurality of local regions among the plurality of ultrasound images for display generated along time series, or among a plurality of raw data. For instance, if the operator starts to take the ultrasound images with the "start switch of rotation axis display mode" turned ON, the change amount calculating unit 15*c* starts the change amount calculation process.

The local region is the region of interest set in advance to monitor the amount of change of the pattern. FIG. 3 is a schematic diagram for explaining one embodiment of the local region.

For instance, as shown in FIG. 3, the change amount calculating unit 15*c* sets nine reed shaped ROIs (ROI1 to ROI9) of arrayed in the lateral direction with respect to the ultrasound image as a plurality of local regions in each ultrasound image using a coordinate set in the ultrasound image. In other words, each of the plurality of ROIs which are the plurality of local regions is set along the longitudinal direction in the ultrasound image. For instance, the ROI is set along the scanning line of the ultrasound wave.

The coordinate in each ultrasound image of each ROI1 to ROI9 is stored in advanced in the internal storage unit 18. Alternatively, the coordinate in each ultrasound image of each ROI1 to ROI9 may be manually set by the operator using a mouse of the input device 3. The number of ROI is not limited to nine and may be arbitrarily changed. In one embodiment shown in FIG. 3, each ROI is set with a predetermined spacing, but the first embodiment can also be applied when each ROI is set to partially overlap.

In the embodiment shown in FIG. 3, each reed shaped ROI is set to substantially cover the depth direction of the ultrasound image. In the first embodiment, however, the length in the longitudinal direction of each reed shaped ROI may be arbitrarily changed. For instance, the length in the longitudinal direction of each reed shaped ROI may be set to cover one part in the depth direction of the ultrasound image (only center unit in the longitudinal direction of the ultrasound image). According to such setting, the load required for the process of the change amount calculating unit 15*c* can be reduced.

The change amount calculating unit 15*c* according to the first embodiment calculates a cross correlation coefficient (R) between the local regions as an amount of change of the pattern.

A case in which the calculation process of the cross correlation coefficient by the change amount calculating unit 15*c* is executed between an image "i" and an image "i+1" which are two ultrasound images (ultrasound images for display) continuing along time series will be described below. In the first embodiment, the process by the change amount calculating unit 15*c* may be executed between the ultrasound images spaced apart by a few images (e.g., image "i" and image "i+m" (where m is a natural number greater than or equal to two)) if the difference between proximate images is small. The value of "m" may be stored in advance in the internal storage unit 18 or may be input through the input device 3 by the operator before turning ON the "start switch of rotation axis display mode".

For instance, the change amount calculating unit 15c calculates the cross correlation coefficient of each local region with the following equation (1).

$$R = \frac{\sum (x_i - \bar{x})(y_i - \bar{y})/n}{\sqrt{\sum (x_i - \bar{x})^2 /n} * \sqrt{\sum (y_i - \bar{y})^2 /n}} \quad (1)$$

Here, "n" shown in equation (1) is the number of signals (pixels) of the local region in which the cross correlation coefficient is to be calculated. Furthermore, "$x_i$" shown in equation (1) is the signal value (pixel value) extracted from the local region of image "i", and "$y_i$" shown in equation (1) is the signal value (pixel value) extracted from the local region of image "i+1". A symbol (bar x) in which a horizontal bar is given above "x" shown in equation (1) is an average value calculated from all "$x_i$" values extracted from the local region of image "i". A symbol (bar y) in which a horizontal bar is given above "y" shown in equation (1) is an average value calculated from all "$y_i$" values extracted from the local region of image "i+1".

The amount of change of the pattern between the regions positioned in the vicinity of the rotation axis is assumed to become small. In other words, the covariate cross correlation coefficient of the pattern between the regions positioned in the vicinity of the rotation axis is assumed to become large. The amount of change of the pattern between the regions positioned at places distant from the rotation axis is assumed to become large since the scanning cross-section of the ultrasound wave greatly changes by rotation. In other words, the cross correlation coefficient between the regions positioned at places distant from the rotation axis is assumed to become small.

Therefore, the amount of change of the pattern calculated by the change amount calculating unit 15c may be calculated using various methods proposed in the prior art other than the cross correlation coefficient as long as it is a value where the value changes according to the positional relationship with the rotation axis. The first embodiment can also be applied when the target of calculating the amount of change of the pattern is raw data.

Returning back to FIG. 2, the estimating unit 15d estimates the position of the rotation axis of the scanning cross-section in each ultrasound image based on the amount of change of the pattern of each of the plurality of local regions calculated by the change amount calculating unit 15c. The rotation axis of the scanning cross-section is the rotation axis of the ultrasound probe 1. Therefore, the estimating unit 15d estimates the position of the rotation axis of the ultrasound probe 1 in each ultrasound image based on the amount of change of the pattern of each of the plurality of local regions. Specifically, the estimating unit 15d estimates the position of the rotation axis of the ultrasound probe 1 (scanning cross-section) based on the cross correlation coefficient between the local regions calculated by the change amount calculating unit 15c. As described above, the place where the correlation coefficient is large is estimated to be the place where the rotation axis is positioned in the ultrasound image. Therefore, the estimating unit 15d can estimate the position of the local region where the cross correlation coefficient calculated by the change amount calculating unit 15c becomes a maximum as the position of the rotation axis. However, the estimating unit 15d according to the first embodiment carries out the processes described below to more accurately estimate the position of the rotation axis.

Figure 4A:
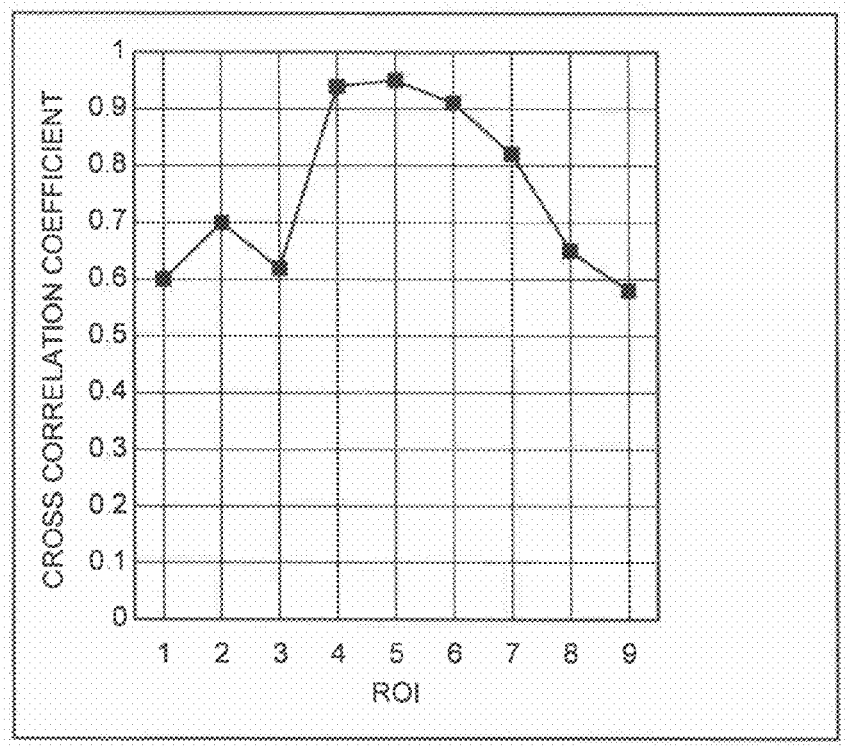
FIG. 4A and FIG. 4B are schematic diagrams for explaining one embodiment of the process of the estimating unit according to the first embodiment.
Figure 4B:
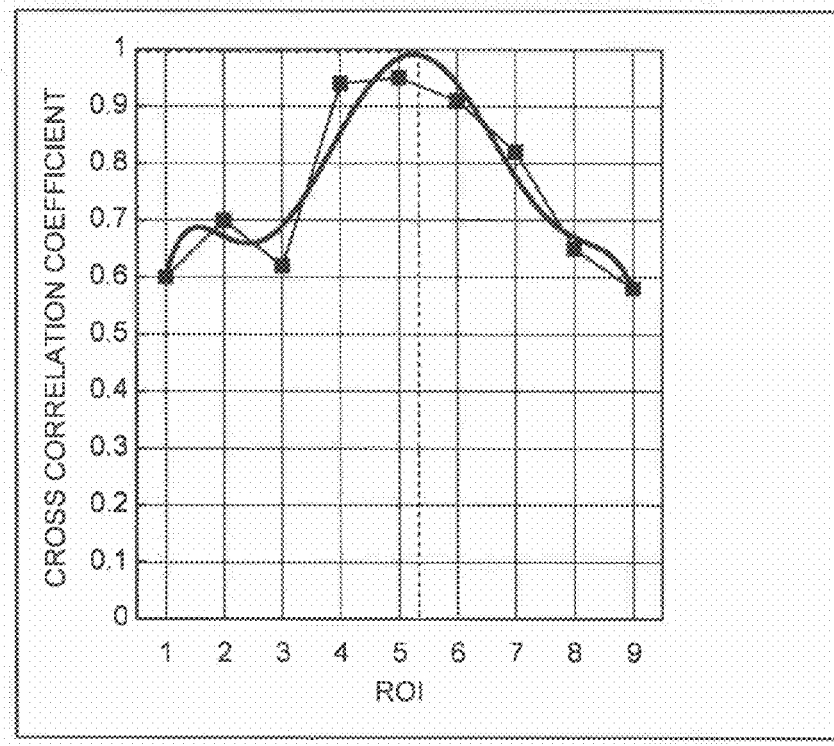

FIG. 4A and FIG. 4B are schematic diagrams for explaining one embodiment of the process of the estimating unit according to the first embodiment.

As shown in FIG. 4A, the estimating unit 15d generates a graph in which the cross correlation coefficient of each of the plurality of local regions (ROI 1 to 9) is plotted according to the position in the ultrasound image of each local region (ROI 1 to 9).

The estimating unit 15d can estimate the place (center position in lateral direction of ROI 5) of maximum value of the cross correlation coefficient in the graph of FIG. 4A as simply the position of the rotation axis. However, the calculation result of the cross correlation coefficient also contains noise component as shown in the graph of FIG. 4A, where the accuracy may be degraded if the position of the rotation axis is estimated by simply using the maximum value.

As shown in FIG. 4B, the estimating unit 15d generates an approximate curve in which the graph of FIG. 4A is approximated using a polynomial equation, for instance. In other words, the estimating unit 15d approximates the shape of the graph by a curve. As shown in FIG. 4B, the estimating unit 15d estimates the position where the cross correlation coefficient in the generated approximate curve becomes a maximum as the position of the rotation axis in the ultrasound image. That is, the estimating unit 15d estimates the position of the rotation axis using the peak value estimated from the general form of the graph.

The estimating unit 15d then performs a process of determining whether or not to determine the estimated rotation axis as the rotation axis. In other words, the estimating unit 15d determines that the position of the rotation axis of the ultrasound probe 1 (scanning cross-section) is non-estimatable if the amount of change of the pattern used to estimate the position of the rotation axis of the ultrasound probe 1 (scanning cross-section) is greater than a predetermined threshold value. In the first embodiment in which the cross correlation coefficient is calculated as the pattern change amount, the estimating unit 15d determines that the position of the rotation axis of the ultrasound probe 1 is non-estimatable if the cross correlation coefficient used to estimate the position of the rotation axis of the ultrasound probe 1 is smaller than the predetermined threshold value.

For instance, the estimating unit 15d determines that the position of the rotation axis is non-estimatable if the calculated cross correlation coefficient or the estimated cross correlation coefficient is smaller than a threshold value (e.g., 0.8) set in advance.

Returning back to FIG. 2, the control unit 17 performs a control to superimpose the rotation axis estimated by the estimating unit 15d on each ultrasound image and display the same on the monitor 2. Specifically, the image synthesizing unit 15b shown in FIG. 2 generates a composite image in which the rotation axis of the ultrasound probe 1 (scanning cross-section) is superimposed on each ultrasound image based on the estimation result of the estimating unit 15d, and the control unit 17 performs a control to display the composite image on the monitor 2. In other words, the image synthesizing unit 15b generates the composite image in which the rotation axis of the ultrasound probe 1 (scanning cross-section) is superimposed on the image "i+1" based on the estimation result of the estimating unit 15d.

The control unit 17 also performs a control to display the graph generated by the estimating unit 15d on the monitor 2. In other words, the control unit 17 performs a control to display the graph generated to estimate the rotation axis by the estimating unit 15d on the monitor 2 with the composite image in which the rotation axis of the ultrasound probe 1 is superimposed on the image "i+1".

Figure 5A:
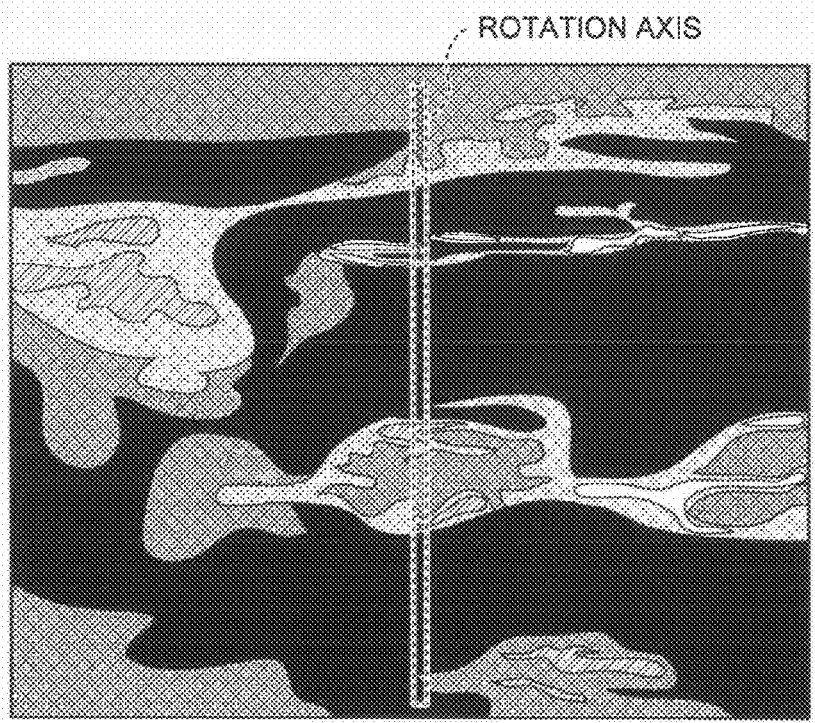
FIG. 5A and FIG. 5B are schematic diagrams for explaining one embodiment of an image displayed based on the estimation result of the estimating unit according to the first embodiment.
Figure 5B:
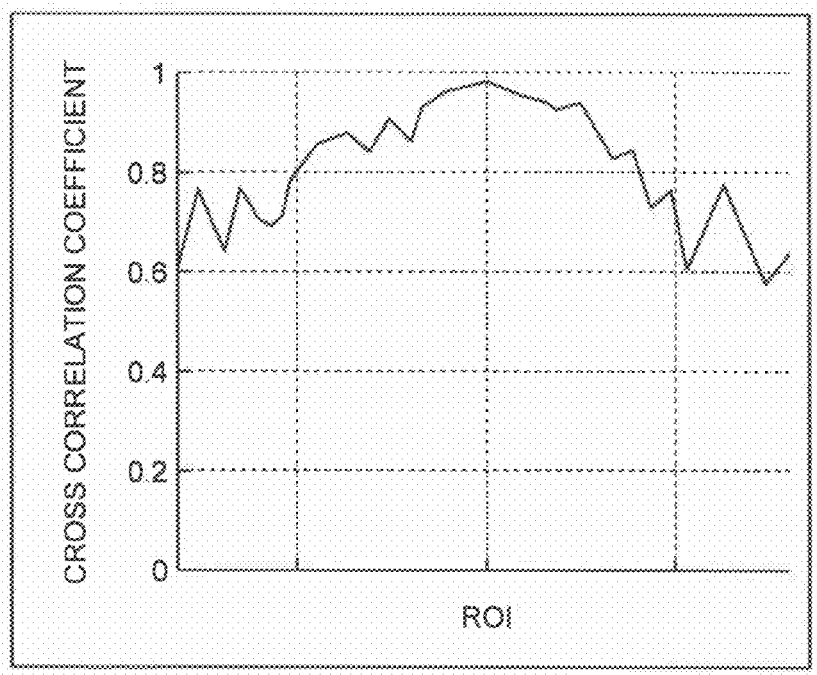

FIG. 5A and FIG. 5B are schematic diagrams for explaining one embodiment of an image displayed based on the estimation result of the estimating unit according to the first embodiment. For instance, as shown in FIG. 5A, the image synthesizing unit 15b generates a composite image in which the rotation axis of the ultrasound probe 1 in the image "i+1" estimated by the estimating unit 15d is represented with a rectangle of thin dotted line. The monitor 2 displays the composite image shown in FIG. 5A by the control of the control unit 17. The reader can grasp the position of the rotation axis while ensuring visibility of the ultrasound image compared to when the rotation axis is shown with a straight line of solid line by depicting the rotation axis with a rectangle of thin dotted line. If the position of the rotation axis can be grasped while ensuring the visibility of the ultrasound image, the method for depicting the rotation axis can be carried out through an arbitrary method. For instance, the image synthesizing unit 15b may generate the composite image in which the rectangle with enhanced transparency is superimposed on the ultrasound image.

The monitor 2 displays the graph shown in FIG. 5B by the control of the control unit 17. For instance, in the embodiment shown in FIG. 5B, the graph generated by the estimating unit 15d by setting more than nine ROIs is shown. And also, the monitor 2 may display the image in which the approximate curve shown in FIG. 4B is superimposed on the graph by the control of the control unit 17.

The control unit 17 performs a control to non-display the rotation axis of the ultrasound probe 1 when the estimation result of the estimating unit 15d is non-estimatable. In other words, the control unit 17 performs a control to display only the image "i+1" when the estimation result of the estimating unit 15d is non-estimatable.

The process of the ultrasound diagnosis apparatus according to the first embodiment will now be described using FIG. 6. FIG. 6 is a flowchart for explaining the process of the ultrasound diagnosis apparatus according to the first embodiment.

As shown in FIG. 6, the ultrasound diagnosis apparatus according to the first embodiment determines whether or not the imaging request of the ultrasound image of the rotation axis display mode is accepted by turning ON the "start switch of rotation axis display mode" of the input device 3 by the operator (step S101). If the imaging request of the ultrasound image of the rotation axis display mode is not accepted (No at step S101), the ultrasound diagnosis apparatus is in a waiting state.

If the imaging request of the ultrasound image of the rotation axis display mode is accepted (Yes at step S101), the control unit 17 determines whether or not the ultrasound image is generated by the image generating unit 15a (step S102). If the ultrasound image is not generated (No at step S102), the control unit 17 waits until the ultrasound image is generated.

If the ultrasound image is generated (Yes at step S102), the control unit 17 performs a control to display the generated ultrasound image on the monitor 2 (step S103), and sets the displayed ultrasound image as image "i" (step S104).

The control unit 17 determines whether or not a new ultrasound image is generated (step S105), and waits until the new ultrasound image is generated if the new ultrasound image is not generated (No at step S105).

If the new ultrasound image is generated (Yes at step S105), the control unit 17 sets the newly generated ultrasound image as the image "i+1" (step S106), and the change amount calculating unit 15c calculates the cross correlation coefficient in the plurality of ROIs between the image "i" and the image "i+1" (step S107).

The estimating unit 15d generates a graph in which the cross correlation coefficient of each of the plurality of ROIs is plotted according to the position in the ultrasound image of each ROI, and estimates the maximum value of the cross correlation coefficient from the approximate curve of the generated graph (step S108).

Thereafter, the estimating unit 15d determines whether or not the estimated maximum value is greater than or equal to the threshold value (step S109). If the estimated maximum value is smaller than the threshold value (No at step S109), the estimating unit 15d determines that the rotation axis is non-estimatable, and the control unit 17 performs a control to display the image "i+1" on the monitor 2 (step S112).

If the estimated maximum value is greater than or equal to the threshold value (Yes at step S109), the estimating unit 15d estimates the position of the rotation axis (step S110). In other words, the estimating unit 15d estimates the position corresponding to the position of the maximum value estimated from the shape of the graph as the position of the rotation axis in the image "i+1".

Thereafter, the control unit 17 performs a control to display the graph on the monitor 2 with the composite image of the image "i+1" and the rotation axis generated by the image synthesizing unit 15b (step S111).

After the control process of step S111 or step S112, the control unit 17 determines whether or not the imaging end request is accepted from the operator through the input device 3 (step S113). If the imaging end request is not accepted (No at step S113), the control unit 17 sets the image "i+1" as the image "i" (step S114), and returns to step S105 to determine whether or not a new ultrasound image is generated. In other words, the control unit 17 performs a control so that a change amount calculation process is executed between the ultrasound image set as the image "i" in step S113 and the new image set as the image "i+1" in step S106.

If the imaging end request is accepted (Yes at step S113), the control unit 17 terminates the process.

As described above, in the first embodiment, the change amount calculating unit 15c calculates the amount of change of the pattern of each of the plurality of local regions (ROI) among the plurality of ultrasound images (among plurality of raw data or among plurality of display ultrasound images) generated along the time series based on the reflected wave of the ultrasound wave transmitted by the ultrasound probe 1. The estimating unit 15d estimates the position of the rotation axis of the ultrasound probe 1 (scanning cross-section) in each ultrasound image based on the amount of change of the pattern of each of the plurality of local regions (ROI) calculated by the change amount calculating unit 15c. The control unit 17 then performs a control to superimpose the rotation axis estimated by the estimating unit 15d on each ultrasound image and display the same on the monitor 2. Each of the plurality of local regions (ROI) is set along the longitudinal direction in the ultrasound image.

Therefore, in the first embodiment, the ultrasound image in which the estimated rotation axis is superimposed is displayed, so that the reader can easily distinguish the movement state of the ultrasound probe 1 by simply referencing the ultrasound image. Furthermore, as the rotation axis is displayed, the reader can grasp that the displayed image is taken during the rotation of the ultrasound probe 1 and an accurate image diagnosis can be carried out. Skill is necessary for the operator to accurately rotate the ultrasound probe 1 with the center of the image as the rotation axis. Therefore, whether or not the ultrasound probe 1 is rotating with the site to be focused as the center can be grasped by performing the display process of the rotation axis described above, which supports to enhance the level of skill of the operator.

In the first embodiment, the estimating unit 15*d* generates a graph in which the amount of change of the pattern of each of the plurality of local regions (ROI) is plotted according to the position in the ultrasound image of each local region (ROI), and estimates the position of the rotation axis of the ultrasound probe 1 which is the rotation axis of the scanning cross-section based on the generated graph. The control unit 17 performs a control to display the graph generated by the estimating unit 15*d* on the monitor 2. Therefore, in the first embodiment, the peak in the amount of change of the pattern can be estimated using the approximate curve of the graph and the position of the rotation axis can be accurately estimated. In the first embodiment, the reader can check the accuracy of the position of the estimated rotation axis since the graph (or graph and approximate curve) serving as a basis for estimating the position of the rotation axis is displayed.

In the first embodiment, the estimating unit 15*d* determines that the position of the rotation axis of the ultrasound probe 1 is non-estimatable if the amount of change of the pattern used to estimate the position of the rotation shaft is greater than a predetermined threshold value. The control unit 17 performs a control to not display the rotation axis if the estimation result of the estimating unit 15*d* is non-estimatable. Therefore, the position of the rotation axis having low reliability can be avoided from being presented to the reader in the first embodiment.

Furthermore, in the first embodiment, the change amount calculating unit 15*c* calculates the cross correlation coefficient as the amount of change of the pattern. Therefore, in the first embodiment, the position of the rotation axis can be easily estimated using the known computing process.

Figure 7:
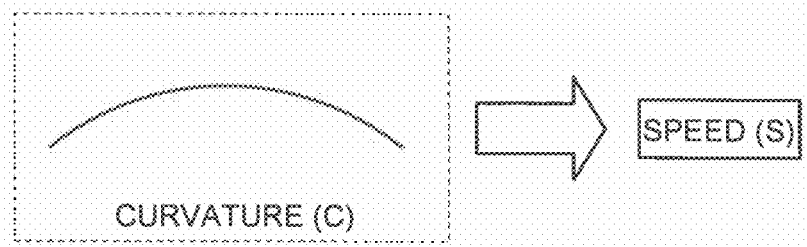
FIG. 7 is a schematic diagram for explaining one embodiment of a process of the estimating unit according to a second embodiment.

In a second embodiment, a case in which an index value indicating the movement state of the ultrasound probe 1 is estimated with the rotation axis of the ultrasound probe 1 will be described using FIG. 7. FIG. 7 is a schematic diagram for explaining one embodiment of a process of the estimating unit according to the second embodiment.

An ultrasound diagnosis apparatus according to the second embodiment is configured similar to the ultrasound diagnosis apparatus according to the first embodiment described using FIG. 1, and the image processing unit 15 according to the second embodiment is configured similar to the image processing unit 15 according to the first embodiment described using FIG. 2. However, the estimating unit 15*d* according to the second embodiment further carries out the following estimation process. In other words, the estimating unit 15*d* according to the second embodiment estimates the speed at which the scanning cross-section is being rotated based on the change rate of the amount of change of the pattern of each of the plurality of local regions (ROI) in the graph with the rotation axis. In other words, the estimating unit 15*d* according to the second embodiment estimates the speed at which the ultrasound probe 1 is being rotated.

First, the estimating unit 15*d* according to the second embodiment generates an approximate curve of the graph to estimate the position of the rotation axis, similar to the first embodiment. Similar to the first embodiment, the estimating unit 15*d* according to the second embodiment estimates the maximum value of the cross correlation coefficient using the generated approximate curve. As shown in FIG. 7, the estimating unit 15*d* according to the second embodiment then calculates a curvature (C) around the maximum value estimated in the approximate curve. The estimating unit 15*d* according to the second embodiment then estimates the speed (S) from the calculated curvature, as shown in FIG. 7. If the speed at which the ultrasound probe 1 is being rotated is large, the cross correlation coefficient is assumed to become rapidly smaller with the estimated maximum value as the center. If the speed at which the ultrasound probe 1 is being rotated is small, the cross correlation coefficient is estimated to become gradually smaller with the estimated maximum value as the center. In other words, the curvature in the vicinity of the maximum value in the approximate curve changes according to the speed at which the ultrasound probe 1 is being rotated. The estimating unit 15*d* according to the second embodiment then estimates the speed at which the ultrasound probe 1 is being rotated from the calculated curvature by storing a "table (LUT: Lookup Table) in which speed (S) and curvature (C) are corresponded" in advance in the internal storage unit 18, for instance.

The estimating unit 15*d* according to the second embodiment performs a comparison process of the estimated maximum value and the threshold value, similar to the first embodiment, and does not estimate the speed with the rotation axis if the maximum value is smaller than the threshold value.

The control unit 17 according to the second embodiment further performs a control to display the speed at which the ultrasound probe 1 is being rotated estimated by the estimating unit 15*d* on the monitor 2.

The process of the ultrasound diagnosis apparatus according to the second embodiment will be described using FIG. 8. FIG. 8 is a flowchart for explaining the process of the ultrasound diagnosis apparatus according to the second embodiment.

As shown in FIG. 8, the ultrasound diagnosis apparatus according to the second embodiment determines whether or not the imaging request of the ultrasound image of the rotation axis display mode is accepted by turning ON the "start switch of rotation axis display mode" of the input device 3 by the operator (step S201). If the imaging request of the ultrasound image of the rotation axis display mode is not accepted (No at step S201), the ultrasound diagnosis apparatus is in a waiting state.

If the imaging request of the ultrasound image of the rotation axis display mode is accepted (Yes at step S201), the control unit 17 determines whether or not the ultrasound image is generated by the image generating unit 15*a* (step S202). If the ultrasound image is not generated (No at step S202), the control unit 17 waits until the ultrasound image is generated.

If the ultrasound image is generated (Yes at step S202), the control unit 17 performs a control to display the generated ultrasound image on the monitor 2 (step S203), and sets the displayed ultrasound image as image "i" (step S204).

The control unit 17 determines whether or not a new ultrasound image is generated (step S205), and waits until the new ultrasound image is generated if the new ultrasound image is not generated (No at step S205).

If the new ultrasound image is generated (Yes at step S205), the control unit 17 sets the newly generated ultrasound image as the image "i+1" (step S206), and the change amount calculating unit 15*c* calculates the cross correlation coefficient in the plurality of ROIs between the image "i" and the image "i+1" (step S207).

The estimating unit 15d generates a graph in which the cross correlation coefficient of each of the plurality of ROIs is plotted according to the position in the ultrasound image of each ROI, and estimates the maximum value of the cross correlation coefficient from the approximate curve of the generated graph (step S208).

Thereafter, the estimating unit 15d determines whether or not the estimated maximum value is greater than or equal to the threshold value (step S209). If the estimated maximum value is smaller than the threshold value (No at step S209), the estimating unit 15d determines that the rotation axis and the speed are not estimatable, and the control unit 17 performs a control to display the image "i+1" on the monitor 2 (step S212).

If the estimated maximum value is greater than or equal to the threshold value (Yes at step S209), the estimating unit 15d estimates the position and the speed of the rotation axis (step S210). In other words, the estimating unit 15d calculates the curvature of the approximate curve in the vicinity of the estimated maximum value and estimates the speed corresponding to the calculated curvature as the speed at which the ultrasound probe 1 is being rotated.

Thereafter, the control unit 17 performs a control to display the graph and the speed on the monitor 2 with the composite image of the image "i+1" and the rotation axis generated by the image synthesizing unit 15b (step S211).

After the control process of step S211 or step S212, the control unit 17 determines whether or not the imaging end request is accepted from the operator through the input device 3 (step S213). If the imaging end request is not accepted (No at step S213), the control unit 17 sets the image "i+1" as the image "i" (step S214), and returns to step S205 to determine whether or not a new ultrasound image is generated.

If the imaging end request is accepted (Yes at step S213), the control unit 17 terminates the process.

As described above, in the second embodiment, the estimating unit 15d estimates the speed at which the ultrasound probe 1 (scanning cross-section) is being rotated based on the change rate of the amount of change of the pattern of each of the plurality of local regions in the graph. The control unit 17 further performs a control to display the speed at which the ultrasound probe 1 (scanning cross-section) is being rotated estimated by the estimating unit 15d on the monitor 2. Therefore, in the second embodiment, the estimated speed is also displayed, so that the reader can easily distinguish the movement state of the ultrasound probe 1 by simply referencing the ultrasound image. Furthermore, when the speed is not constant, this can be grasped by performing the display process of the speed, which supports to further enhance the level of skill of the operator.

In the first and second embodiments, a case in which the processes of the change amount calculating unit 15c and the estimating unit 15d are executed in real time with the imaging of the ultrasound image has been described. However, the first and second embodiments may be a case in which the processes of the change amount calculating unit 15c and the estimating unit 15d are executed using the raw data or the display ultrasound image stored in the image memory 16 after the imaging of the ultrasound image is finished.

Moreover, in the first and second embodiments, a case in which the image processing on the ultrasound image is carried out in the ultrasound diagnosis apparatus has been described. However, the image processing may be carried out by an image processing apparatus installed independent from the ultrasound diagnosis apparatus. Specifically, the image processing apparatus having the function of the image processing unit 15 other than the image generating unit 15a shown in FIG. 2 and the display control function of the control unit 17 may receive a plurality of ultrasound images along the time series from the ultrasound diagnosis apparatus, a PACS (Picture Archiving and Communication Systems) database or a system for managing data of various types of medical images, or a database of an electronic chart system for managing an electronic chart attached with medical images, and carry out the image processing described above.

In the first and second embodiments, a case in which the rotation axis of the scanning cross-section is superimposed and displayed in the ultrasound image when the operator manually rotates the ultrasound probe 1 for two-dimensionally scanning the subject P to rotate the scanning cross-section has been described. In such a case, the rotation axis of the ultrasound probe 1 becomes the rotation axis of the scanning cross-section. However, the rotation of the scanning cross-section may be executed by a mechanical control rather than the procedure by the operator.

One embodiment in which the rotation of the scanning cross-section is executed by a mechanical control includes a case in which the ultrasound probe 1 is a TEE (transesophageal echocardiography) probe. Alternatively, one embodiment in which the rotation of the scanning cross-section is executed by a mechanical control includes a case in which the ultrasound probe 1 is a 2D probe where a plurality of vibrators is arranged in a matrix form. The 2D probe can three-dimensionally ultrasound scan the subject P by the plurality of vibrators arranged in a matrix form, and can also two-dimensionally scan the subject P by converging and transmitting the ultrasound wave.

When the scanning cross-section is rotated in imaging the ultrasound image by the TEE probe or the 2D probe, the rotation axis of the scanning cross-section in the ultrasound image can be estimated using the data regarding the ultrasound wave transmission control carried out on the ultrasound probe 1. However, the data regarding the ultrasound wave transmission control is not necessarily saved as supplementary information of the ultrasound image. Therefore, even if the rotation of the scanning cross-section is executed by the mechanical control, the reading doctor can superimpose and display the rotation axis of the scanning cross-section in the ultrasound image by having the processes of the change amount calculating unit 15c and the estimating unit 15d described in the first and second embodiments executed by the ultrasound diagnosis apparatus or the image processing apparatus. As a result, the reading doctor can easily distinguish the movement state of the ultrasound probe.

The image processing method described in the first and second embodiments can be realized by executing the image processing program prepared in advance with an image processing apparatus which is a computer such as a personal computer, a work station, and the like. The image processing program can be distributed through the network such as Internet. Furthermore, the image processing program may be recorded in a computer readable recording medium such as a hard disk, a floppy disk (FD), a CD-ROM, an MO, a DVD, or the like, and executed by being read from the recording medium by means of the image processing apparatus or a computer.

As described above, according to the first and second embodiments, the movement state of the ultrasound probe can be easily distinguished.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirits of the inventions.

What is claimed is:

1. An ultrasound diagnosis apparatus, comprising:
    an ultrasound probe; and
    a processor having a program stored therein for causing the processor to perform executable units, the units including:
    a change amount calculating unit configured to calculate an amount of change of a pattern of each of a plurality of local regions among a plurality of ultrasound images generated along a time series based on a reflected wave of an ultrasound wave transmitted by the ultrasound probe, wherein the plurality of local regions are set in each of the plurality of ultrasound images and each of the local regions has a width and is set with a predetermined spacing in a lateral direction;
    an estimating unit configured to generate a position of a rotation axis of a scanning cross-section in each ultrasound image based on the amount of change of the pattern of each of the plurality of local regions calculated by the change amount calculating unit, wherein the estimating unit is configured to generate a graph in which the amount of change of the pattern of each of the plurality of local regions is plotted, generate, using curve-fitting, an approximate curve from the plotted points of the graph, and estimate the position of the rotation axis based on the generated approximate curve; and
    a display control unit configured to superimpose the rotation axis estimated by the estimating unit on each ultrasound image and display each ultrasound image on a predetermined display.

2. The ultrasound diagnosis apparatus according to claim 1, wherein each of the plurality of local regions is set along a longitudinal direction in the ultrasound image.

3. The ultrasound diagnosis apparatus according to claim 1, wherein
    the display control unit is further configured to perform a control to display the graph generated by the estimating unit on the predetermined display.

4. The ultrasound diagnosis apparatus according to claim 3, wherein
    the estimating unit is further configured to estimate a speed at which the scanning cross-section is being rotated based on a change rate of the amount of change of the pattern of each of the plurality of local regions in the graph; and
    the display control unit is further configured to perform a control to display the speed at which the scanning cross-section is being rotated estimated by the estimating unit on the predetermined display.

5. The ultrasound diagnosis apparatus according to claim 1, wherein
    the estimating unit is further configured to determine that the position of the rotation axis is non-estimatable when the amount of change of the pattern used to estimate the position of the rotation axis is greater than a predetermined threshold value; and
    the display control unit is further configured to perform a control to non-display the rotation axis when the estimation result of the estimating unit is non-estimatable.

6. The ultrasound diagnosis apparatus according to claim 1, wherein the change amount calculating unit is further configured to calculate a cross correlation coefficient as the amount of change of the pattern.

7. The ultrasound diagnosis apparatus according to claim 1, wherein
    the estimating unit is further configured to estimate a speed at which the scanning cross-section is being rotated based on a difference of the amount of change of the pattern of each of the plurality of local regions.

8. An image processing apparatus, comprising:
    a processor having a program stored therein for causing the processor to perform executable units, the units including:
    a change amount calculating unit configured to calculate an amount of change of a pattern of each of a plurality of local regions among a plurality of ultrasound images generated along a time series based on a reflected wave of an ultrasound wave transmitted by an ultrasound probe, wherein the plurality of local regions are set in each of the plurality of ultrasound images and each of the local regions has a width and is set with a predetermined spacing in a lateral direction;
    an estimating unit configured to estimate a position of a rotation axis of a scanning cross-section in each ultrasound image based on the amount of change of the pattern of each of the plurality of local regions calculated by the change amount calculating unit, wherein the estimating unit is configured to generate a graph in which the amount of change of the pattern of each of the plurality of local regions is plotted, generate, using curve-fitting, an approximate curve from the plotted points of the graph, and estimate the position of the rotation axis based on the generated approximate curve; and
    a display control unit configured to superimpose the rotation axis estimated by the estimating unit on each ultrasound image and display each ultrasound image on a predetermined display.

9. The image processing apparatus according to claim 8, wherein each of the plurality of local regions is set along a longitudinal direction in the ultrasound image.

10. The image processing apparatus according to claim 8, wherein
    the display control unit is further configured to perform a control to display the graph generated by the estimating unit on the predetermined display.

11. The image processing apparatus according to claim 10, wherein
    the estimating unit is further configured to estimate a speed at which the scanning cross-section is being rotated based on a change rate of the amount of change of the pattern of each of the plurality of local regions in the graph; and
    the display control unit is further configured to perform a control to display the speed at which the scanning cross-section is being rotated estimated by the estimating unit on the predetermined display unit.

12. The image processing apparatus according to claim 8, wherein
    the estimating unit is further configured to determine that the position of the rotation axis is non-estimatable when the amount of change of the pattern used to estimate the position of the rotation axis is greater than a predetermined threshold value; and
    the display control unit is further configured to perform a control to non-display the rotation axis when the estimation result of the estimating unit is non-estimatable.

13. The image processing apparatus according to claim 8, wherein the change amount calculating unit is further configured to calculate a cross correlation coefficient as the amount of change of the pattern.

14. The image processing apparatus according to claim 8, wherein
the estimating unit is further configured to estimate a speed at which the scanning cross-section is being rotated based on a difference of the amount of change of the pattern of each of the plurality of local regions.

15. An image processing method executed by a processor, the method comprising:
calculating an amount of change of a pattern of each of a plurality of local regions among a plurality of ultrasound images generated along a time series based on a reflected wave of an ultrasound wave transmitted by an ultrasound probe, wherein the plurality of local regions are set in each of the plurality of ultrasound images and each of the local regions has a width and is set with a predetermined spacing in a lateral direction;
estimating a position of a rotation axis of a scanning cross-section in each ultrasound image based on the amount of change of the pattern of each of the plurality of local regions, wherein the estimating step includes generating a graph in which the amount of change of the pattern of each of the plurality of local regions is plotted, generating, using curve-fitting, an approximate curve from the plotted points of the graph, and estimating the position of the rotation axis based on the generated approximate curve; and
superimposing the rotation axis estimated by the estimating step on each ultrasound image and displaying each ultrasound image on a predetermined display.

16. The image processing method according to claim 15, wherein each of the plurality of local regions is set along a longitudinal direction in the ultrasound image.

17. The image processing method according to claim 15, wherein
the displaying step further includes displaying the graph on the predetermined display.

18. The image processing method according to claim 17, wherein
the estimating step further comprises estimating a speed at which the scanning cross-section is being rotated based on a change rate of the amount of change of the pattern of each of the plurality of local regions in the graph; and
the displaying step further comprises displaying the speed at which the scanning cross-section is being rotated on the predetermined display.

19. The image processing method according to claim 15, wherein
the estimating step further comprises determining that the position of the rotation axis is non-estimatable when the amount of change of the pattern used to estimate the position of the rotation axis is greater than a predetermined threshold value; and
the displaying step further comprises performing a control to non-display the rotation axis when the estimating step determines that the position of the rotation axis is non-estimatable.

20. The image processing method according to claim 15, wherein the calculating step further comprises calculating a cross correlation coefficient as the amount of change of the pattern.

21. The image processing method according to claim 15, wherein
the estimating step further comprises estimating a speed at which the scanning cross-section is being rotated based on a difference of the amount of change of the pattern of each of the plurality of local regions.

* * * * *